US011118505B2

(12) United States Patent
Nakashima et al.

(10) Patent No.: US 11,118,505 B2
(45) Date of Patent: Sep. 14, 2021

(54) COMBUSTION CONTROL SYSTEM FOR ENGINE

(71) Applicant: Mazda Motor Corporation, Hiroshima (JP)

(72) Inventors: Kenichi Nakashima, Hiroshima (JP); Hiroki Tanaka, Kure (JP); Yuichiro Tsumura, Aki-gun (JP); Daisuke Tanaka, Hiroshima (JP); Taiki Maiguma, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 67 days.

(21) Appl. No.: 16/663,777

(22) Filed: Oct. 25, 2019

(65) Prior Publication Data

US 2020/0200078 A1 Jun. 25, 2020

(30) Foreign Application Priority Data

Dec. 21, 2018 (JP) .............................. JP2018-239805

(51) Int. Cl.
*F02M 26/00* (2016.01)
*F02B 77/04* (2006.01)
(Continued)

(52) U.S. Cl.
CPC .......... *F02B 77/04* (2013.01); *F02D 41/0055* (2013.01); *F02M 26/53* (2016.02);
(Continued)

(58) Field of Classification Search
CPC .............. F02M 26/53; F02M 2026/009; F02D 41/0055; F02D 41/0077; F02D 2200/021;
(Continued)

(56) References Cited

U.S. PATENT DOCUMENTS 5,029,567 A * 7/1991 McDougal .............. F02P 5/155
123/406.21
6,484,702 B1 * 11/2002 Riley ...................... F02B 77/04
123/568.11

(Continued)

FOREIGN PATENT DOCUMENTS

JP 2010144670 A 7/2010
WO 2013132613 A1 9/2013

*Primary Examiner* — Phutthiwat Wongwian
*Assistant Examiner* — Sherman D Manley
(74) *Attorney, Agent, or Firm* — Alleman Hall Creasman & Tuttle LLP

(57) ABSTRACT

A combustion control system for an engine mounted on an automobile is provided, which includes an ignition plug, intake and exhaust passages, an EGR passage, an EGR valve, and a control device having a processor which controls the ignition plug and the EGR valve according to an engine operating state and reduces deposit being accumulated inside a combustion chamber. The control device performs a control in which an accumulating amount of the deposit is estimated, and a control in which the deposit is removed when the estimated accumulating amount becomes more than a given setting value. In the deposit removal control, a control of the ignition plug in which a mixture gas is caused to combust by igniting the mixture gas, and a control of the EGR valve in which an amount of exhaust gas introduced into the combustion chamber is decreased, are performed.

6 Claims, 13 Drawing Sheets

(51) Int. Cl.
*F02M 26/53* (2016.01)
*F02D 41/00* (2006.01)
*F02P 5/04* (2006.01)

(52) U.S. Cl.
CPC ........ *F02P 5/045* (2013.01); *F02D 2200/021* (2013.01); *F02D 2200/024* (2013.01); *F02D 2200/10* (2013.01); *F02M 2026/009* (2016.02)

(58) Field of Classification Search
CPC ........... F02D 2200/024; F02D 2200/10; F02D 35/023; F02D 37/02; F02P 5/045; F02P 5/1502; F02B 77/04; Y02T 10/40
See application file for complete search history.

(56) References Cited

U.S. PATENT DOCUMENTS

| | | | | |
|---|---|---|---|---|
| 6,892,691 | B1* | 5/2005 | Uhl | F02D 41/0085 |
| | | | | 123/198 A |
| 2005/0005908 | A1* | 1/2005 | Tanei | F02D 41/006 |
| | | | | 123/406.33 |
| 2005/0028764 | A1* | 2/2005 | Mitani | F01L 1/34 |
| | | | | 123/90.15 |
| 2011/0265761 | A1* | 11/2011 | Amann | F02D 35/027 |
| | | | | 123/406.11 |
| 2012/0316760 | A1* | 12/2012 | Grieser | F02B 3/02 |
| | | | | 701/108 |
| 2015/0034047 | A1* | 2/2015 | Yaguchi | F02B 77/04 |
| | | | | 123/406.45 |
| 2018/0245510 | A1* | 8/2018 | Tobe | F02D 13/0234 |

* cited by examiner

COMBUSTION CONTROL SYSTEM FOR ENGINE

TECHNICAL FIELD

The technology disclosed herein relates to a combustion control system for an engine, mounted on an automobile.

BACKGROUND OF THE DISCLOSURE

In engine combustion, there is an abnormal combustion phenomenon in which combustion starts before ignition (i.e., "pre-ignition"). If the pre-ignition occurs, an engine will be damaged. Therefore, control of the pre-ignition has been an important subject in the engine combustion control.

During combustion, fuel and engine oil adhere to the wall surface of a combustion chamber. This adhered matter is accumulated over time to generate a "deposit." It is known that deposits are a cause of pre-ignition. Therefore, keeping the generation of deposits low is an effective measure against the control of pre-ignition.

Thus, WO2013/132613A1 proposes a technology of removing deposits periodically. In detail, knocking is forcibly caused inside a combustion chamber by periodically advancing the ignition timing. By doing so, the deposits are exfoliated and removed by the impact of knocking.

Originally, since knocking causes noise and vibration, it is desirable to keep knocking under control. However, as disclosed in WO2013/132613A1, knocking can also serve as a way to remove deposits.

Since fuel and an air amount increase in a high-load operating range among engine operating ranges, combustion tends to be intensive. Therefore, knocking is also caused naturally in normal combustion. In particular, it is remarkable in an engine of which the geometric compression ratio is high and a supercharging engine.

Therefore, in order to remove the deposits, it is necessary to forcibly cause the knocking mainly in a low-load operating range.

In recent years, exhaust gas recirculation (EGR) gas (exhaust gas) is introduced into the combustion chamber upon engine combustion in terms of smooth operation, emission control, fuel efficiency control, etc. The rate of EGR gas in a mixture gas is adjusted according to the engine operating state.

When the EGR gas is introduced into the combustion chamber, the air amount decreases accordingly. As a result, since combustion becomes slow, it becomes difficult to generate knocking. Therefore, if there is a large amount of EGR gas, knocking may not occur even if the ignition timing is advanced. The tendency becomes stronger in the low-load operating range. Therefore, the technology of WO2013/132613A1 has room for improvement.

SUMMARY OF THE DISCLOSURE

One purpose of the technology disclosed herein is to implement a combustion control system for an engine capable of effectively controlling pre-ignition by improving a performance of removing deposit.

According to one aspect of the present disclosure, a combustion control system for an engine mounted on an automobile is provided.

The combustion control system includes an ignition plug configured to ignite a mixture gas inside a combustion chamber of the engine, an intake passage configured to introduce intake gas into the combustion chamber, an exhaust passage configured to discharge exhaust gas generated inside the combustion chamber, an exhaust gas recirculation (EGR) passage communicating with the intake passage and the exhaust passage and configured to recirculate a portion of the exhaust gas into the intake passage, an EGR valve configured to adjust an amount of the exhaust gas flowing through the EGR passage, and a control device configured to control the ignition plug and the EGR valve according to an operating state of the engine.

The control device includes a processor configured to execute a deposit reducing module to reduce deposit being accumulated inside the combustion chamber. The deposit reducing module performs a deposit amount estimation control in which an accumulating amount of the deposit is estimated, and a deposit removal control in which the deposit is removed when the estimated accumulating amount of the deposit becomes more than a given setting value. In the deposit removal control, a control of the ignition plug in which the mixture gas is caused to combust by igniting the mixture gas, and a control of the EGR valve in which the amount of the exhaust gas introduced into the combustion chamber is decreased are performed.

That is, in the engine of the technology disclosed herein, EGR is performed during combustion. In detail, during combustion, the portion of exhaust gas is recirculated to the intake passage and the intake gas in which air is mixed with exhaust gas is introduced into the combustion chamber.

The deposit accumulating amount is estimated and the deposit is removed when the accumulating amount becomes more than the given setting value. Since the pre-ignition occurs when the large amount of deposit is accumulated, by reducing the deposit accumulating amount below the given setting value, the occurrence of the pre-ignition can be controlled.

In the combustion control system, in order to remove the deposit, the control to reduce the introducing amount of external EGR gas is performed while the mixture gas is caused to combust by igniting the mixture gas. When the introduced amount of external EGR gas decreases, the air amount increases accordingly. When the air amount increases, knocking becomes easier to be caused. By adjusting the introduced amount of external EGR gas, the occurrence of knocking can be stabilized. If knocking occurs, the deposit can be removed by the impact.

The adjustment of the introducing amount of external EGR gas can be carried out in a wide operating range of the engine. That is, even in the low-load operating range, the occurrence of knocking can be stabilized. As a result, performance of removing deposit is improved and the pre-ignition can effectively be controlled.

The performance of the deposit removal control may be limited when a load is higher than a given value in the operating range of the engine.

In the high-load operating range, since fuel and air amounts increase, combustion tends to become intensive. Therefore, knocking naturally occurs also during the normal combustion. In such a range, when the introducing amount of the external EGR gas is decreased, it tends to frequently cause strong knocking. As a result, noise and vibration may cause uncomfortableness for the occupants of the automobile.

Thus, according to the combustion control system, the performance of the deposit removal control is limited in the high-load side where the load is higher than the given value in the operating range of the engine. In this manner, strong knocking is prevented from occurring.

The engine combustion control system may further include an in-cylinder pressure sensor configured to detect a pressure inside the combustion chamber. The deposit reducing module may perform, in the deposit amount estimation control, a deposit increasing amount estimation processing in which an increasing amount of the deposit that changes with time is estimated based on a surface temperature of a piston exposed to the combustion chamber, and a deposit decreasing amount estimation processing in which a decreasing amount of the deposit that changes with time is estimated based on a given combustion noise index value calculated based on a detection value of the in-cylinder pressure sensor, to estimate the accumulating amount of the deposit based on the increasing amount and the decreasing amount of deposit.

Although the detail will be described later, the deposit increasing amount that changes with time is accurately estimated based on the surface temperature of the piston exposed to the combustion chamber. Moreover, the deposit decreasing amount that changes with time is accurately estimated based on the given combustion noise index value calculated based on the detection value of the in-cylinder pressure sensor. Therefore, based on the deposit increasing and decreasing amounts, the accumulating amount of deposit that changes with time can be estimated with high accuracy.

If the accumulating amount of the deposit is accurately estimated, the removal of the deposit can be performed at a suitable timing. The performance of removing deposit can be improved and the pre-ignition can effectively be controlled.

In this case, the deposit reducing module may perform, during the execution of the deposit removal control, the deposit increasing amount estimation processing and the deposit decreasing amount estimation processing to estimate the accumulating amount of deposit based on the increasing amount and the decreasing amount of deposit, and when the estimated accumulating amount of the deposit becomes below a given setting value, the deposit reducing module may end the deposit removal control.

In the deposit removal control, knocking is caused and the deposit is removed by the impact. In order to remove the deposit sufficiently, it is required to cause knocking many times. Here, if the increase and decrease of deposit are estimated, the end timing of the deposit removal control can be determined quantitatively, which leads the efficient and effective deposit removal control.

The deposit reducing module may further perform, after the execution of the deposit removal control, an accumulating period control to determine whether a given period is lapsed, and perform the deposit removal control also when the given period is lapsed.

That is, the accumulating period control is performed in parallel to the deposit amount estimation control. Since the timing of the deposit removal control is determined based on these controls which are independent from each other, the removal of deposit is performed even more securely.

A control in which an ignition timing of the ignition plug is advanced may further be performed in the deposit removal control.

If the ignition timing is advanced, knocking becomes easier to be caused. Therefore, if the ignition timing is advanced in combination with the reduction of the introducing amount of external EGR gas, knocking tends to become further easier to be caused.

According to another aspect of the present disclosure, a method of controlling combustion of an engine mounted on an automobile is provided. The engine includes an ignition plug configured to ignite a mixture gas inside a combustion chamber of the engine, an intake passage configured to introduce intake gas into the combustion chamber, an exhaust passage configured to discharge exhaust gas generated inside the combustion chamber, an exhaust gas recirculation (EGR) passage communicating with the intake passage and the exhaust passage and configured to recirculate a portion of the exhaust gas into the intake passage, and an EGR valve configured to adjust an amount of the exhaust gas flowing through the EGR passage. The method includes controlling the ignition plug and the EGR valve according to an operating state of the engine, and reducing deposit being accumulated inside the combustion chamber. The reducing the deposit includes performing a deposit amount estimation control in which an accumulating amount of the deposit is estimated, and a deposit removal control in which the deposit is removed when the estimated accumulating amount of the deposit becomes more than a given setting value, and in the deposit removal control, performing a control of the ignition plug in which the mixture gas is caused to combust by igniting the mixture gas, and a control of the EGR valve in which the amount of the exhaust gas introduced into the combustion chamber is decreased.

DETAILED DESCRIPTION OF THE DISCLOSURE

Hereinafter, embodiments of the present disclosure are described in detail with reference to the accompanying drawings. Note that the following description is essentially nothing more than an illustration, and is not to limit the present disclosure, an application thereof, or a usage thereof. In other words, the description of each component is illustrative and is suitably changeable without departing from the scope of the present disclosure.

<Engine>

Figure 1:
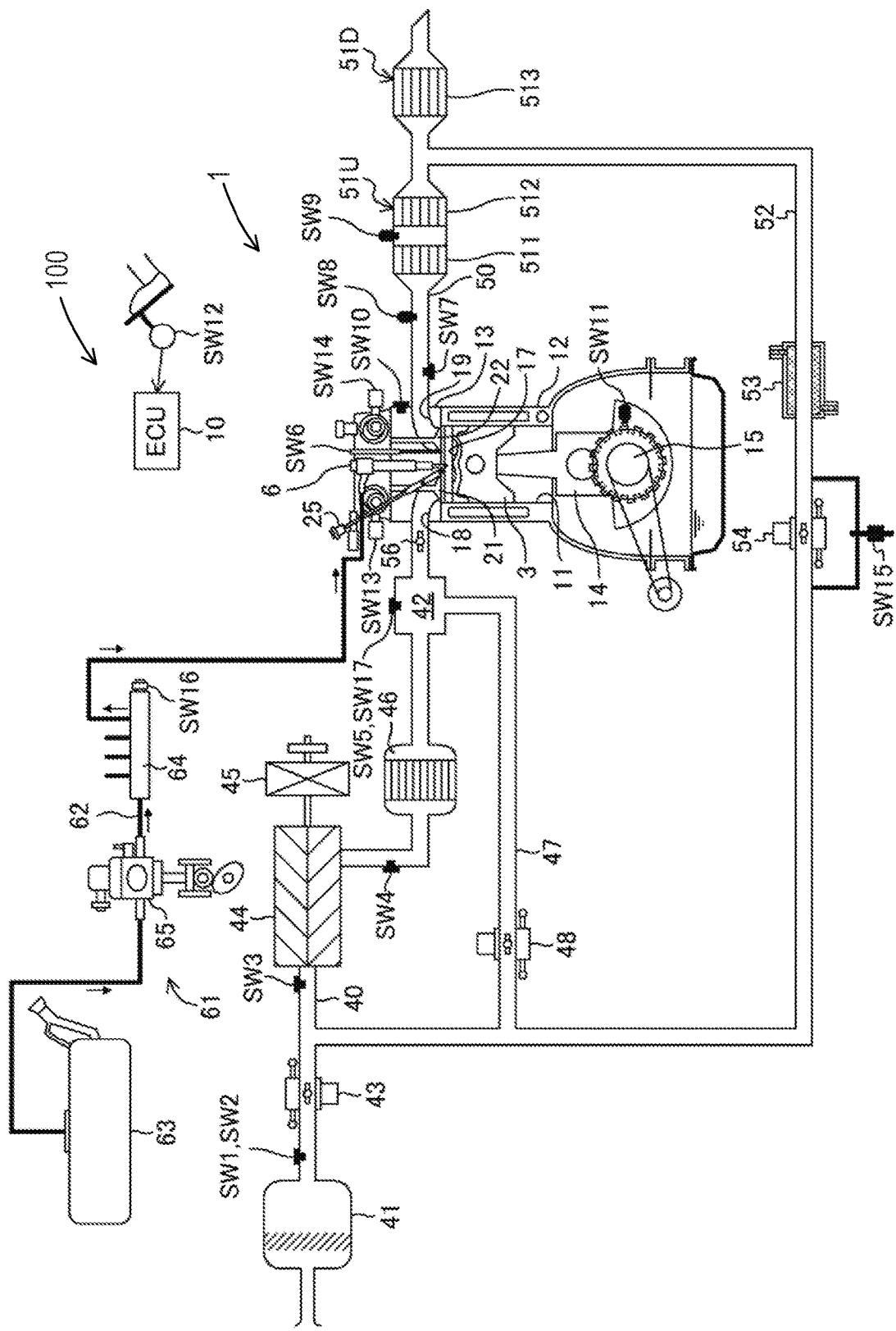
FIG. 1 is a view schematically illustrating a configuration of an engine to which the present disclosure is applied.

FIG. 1 illustrates an engine 1 to which the present disclosure is applied. The engine 1 is a four-stroke reciprocating engine which is operated by a combustion chamber 17 repeating intake stroke, compression stroke, expansion stroke, and exhaust stroke. The engine 1 is mounted on a four-wheel automobile. The automobile travels by the operation of the engine 1.

Although described later in detail, the engine 1 includes a combustion control system 100 including an ECU (Engine Control Unit) 10. The engine 1 is controlled by the ECU 10. The ECU 10 constitutes the control device of the combustion control system 100 of the present disclosure.

Fuel of the engine 1 is gasoline in this embodiment. The fuel may be any kind of fuel as long as it is liquid fuel containing at least gasoline. The gasoline may contain bioethanol, etc.

The engine 1 includes a cylinder block 12 and a cylinder head 13 placed on the cylinder block 12. The cylinder block 12 is formed therein with a plurality of cylinders 11. In FIG. 1, only one cylinder 11 is illustrated. The engine 1 is a multi-cylinder engine.

A piston 3 is reciprocatably inserted into each cylinder 11. The piston 3 is coupled to a crankshaft 15 via a connecting rod 14. The piston 3 defines the combustion chamber 17 together with the cylinder 11 and the cylinder head 13. An upper surface (top surface) of the piston 3 is exposed to the combustion chamber 17.

Note that the "combustion chamber" may have a broad definition. That is, "combustion chamber" may mean any space formed by the piston 3, the cylinder 11 and the cylinder head 13 regardless of the position of the piston 3.

Figure 2:
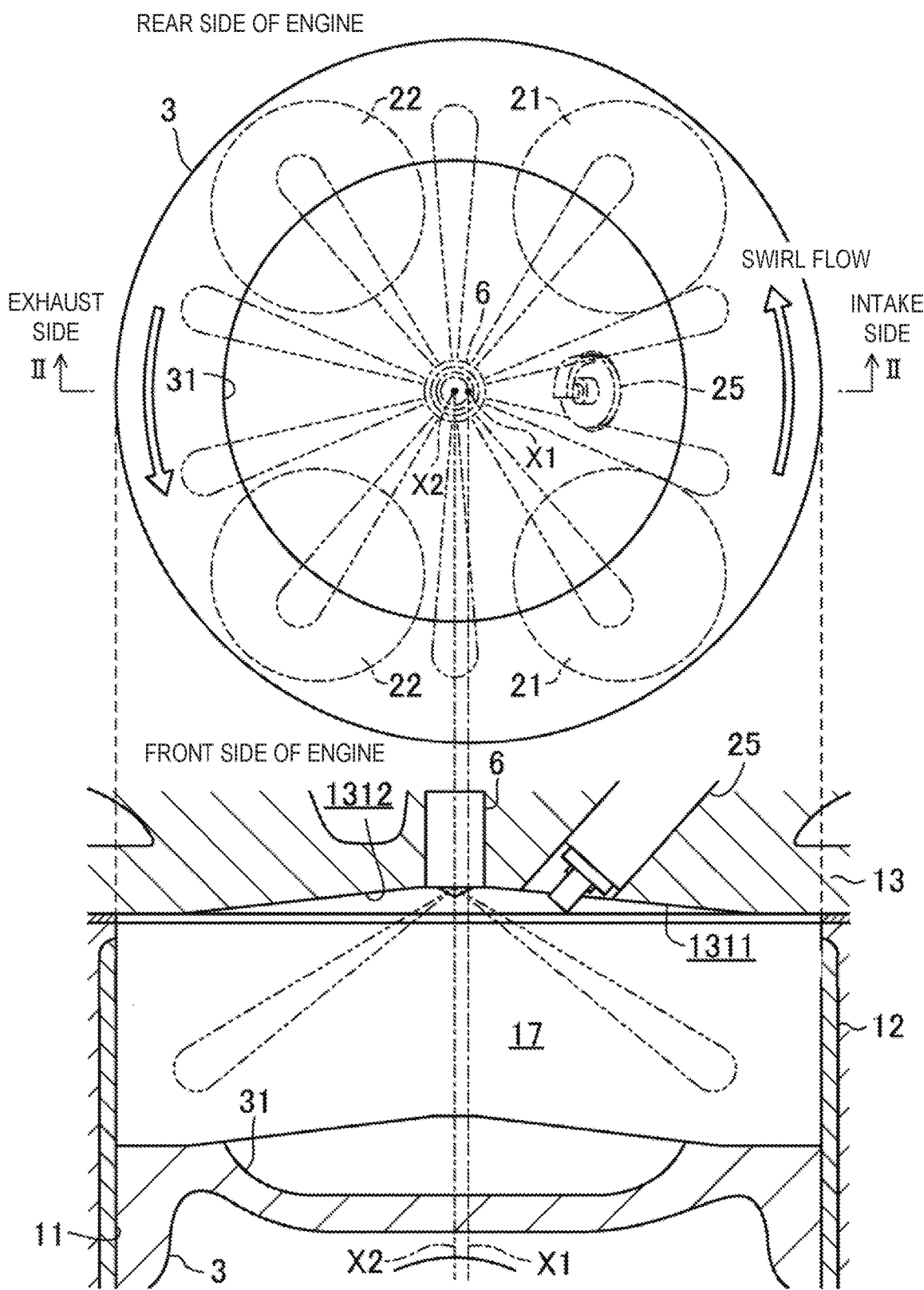
FIG. 2 is a view illustrating a configuration of a combustion chamber, where an upper drawing is a plan view of a combustion chamber, and a lower drawing is a cross-sectional view taken along a line II-II.

As illustrated in the lower drawing of FIG. 2, a lower surface of the cylinder head 13, that is, a ceiling surface of the combustion chamber 17, is formed by an inclined surface 1311 and an inclined surface 1312. The inclined surface 1311 inclines upwardly toward an injection axis X2 (an axis passing through the center of injection of an injector 6 described later) from the intake side. The inclined surface 1312 inclines upwardly toward the injection axis X2 from the exhaust side. The ceiling surface of the combustion chamber 17 has a so-called pent-roof shape.

The upper surface of the piston 3 exposed to the combustion chamber 17 bulges toward the ceiling surface of the combustion chamber 17. The piston 3 is dented in its upper surface to form a cavity 31. The cavity 31 has a shallow plate shape in this embodiment. The center of the cavity 31 is offset from a center axis X1 of the cylinder 11 to the exhaust side.

As described later, within some operating ranges of the engine 1, the engine 1 performs SPCCI (SPark Controlled Compression Ignition) combustion in which SI (Spark Ignition) combustion and the CI (Compression Ignition) combustion are combined.

The SI combustion is combustion accompanying flame propagation which starts by forcibly igniting a mixture gas inside the combustion chamber 17. The CI combustion is combustion which starts by the mixture gas inside the combustion chamber 17 igniting by being compressed.

In the SPCCI combustion, the mixture gas inside the combustion chamber 17 is forcibly ignited to start combustion involving flame propagation. Thus, the heat generation in the SI combustion and a pressure increase due to flame propagation cause the CI combustion of unburned mixture gas inside the combustion chamber 17. In other words, the SPCCI combustion controls the CI combustion by utilizing the heat generated by the SI combustion and the pressure increase. The engine 1 is a compression-ignition engine.

The geometric compression ratio of the engine 1 may be set to between 10:1 and 30:1. For example, the geometric compression ratio of the engine 1 may be set to 16:1 or higher, which is higher than general spark-ignition engines. However, since the engine 1 performs the SPCCI combustion, there is no need for increasing a temperature of the combustion chamber 17 when the piston 3 reaches a top dead center on compression stroke (CTDC), i.e., compression-end temperature. The geometric compression ratio of the engine 1 may be set relatively low. Making the geometric compression ratio low is advantageous in reducing a cooling loss and a mechanical loss.

Further, the geometric compression ratio of the engine 1 may be set to 14:1 to 17:1 in regular specifications (the octane number of the fuel is about 91) and to 15:1 to 18:1 in high-octane specifications (the octane number of the fuel is about 96).

The cylinder head 13 is formed with an intake port 18 for each cylinder 11. Although not illustrated, the intake port 18 includes two intake ports. The intake port 18 communicates with the combustion chamber 17. The intake port 18 is a so-called tumble port. That is, the intake port 18 has a shape to form a tumble flow in the combustion chamber 17.

An intake valve 21 is disposed in the intake port 18. The intake valve 21 opens and closes the intake port 18 to and from the combustion chamber 17. The intake valve 21 is opened and closed by a valve operating mechanism at a given timing. This valve operating mechanism may be a variable valve operating mechanism which makes a valve timing and/or valve lift variable.

Figure 3:
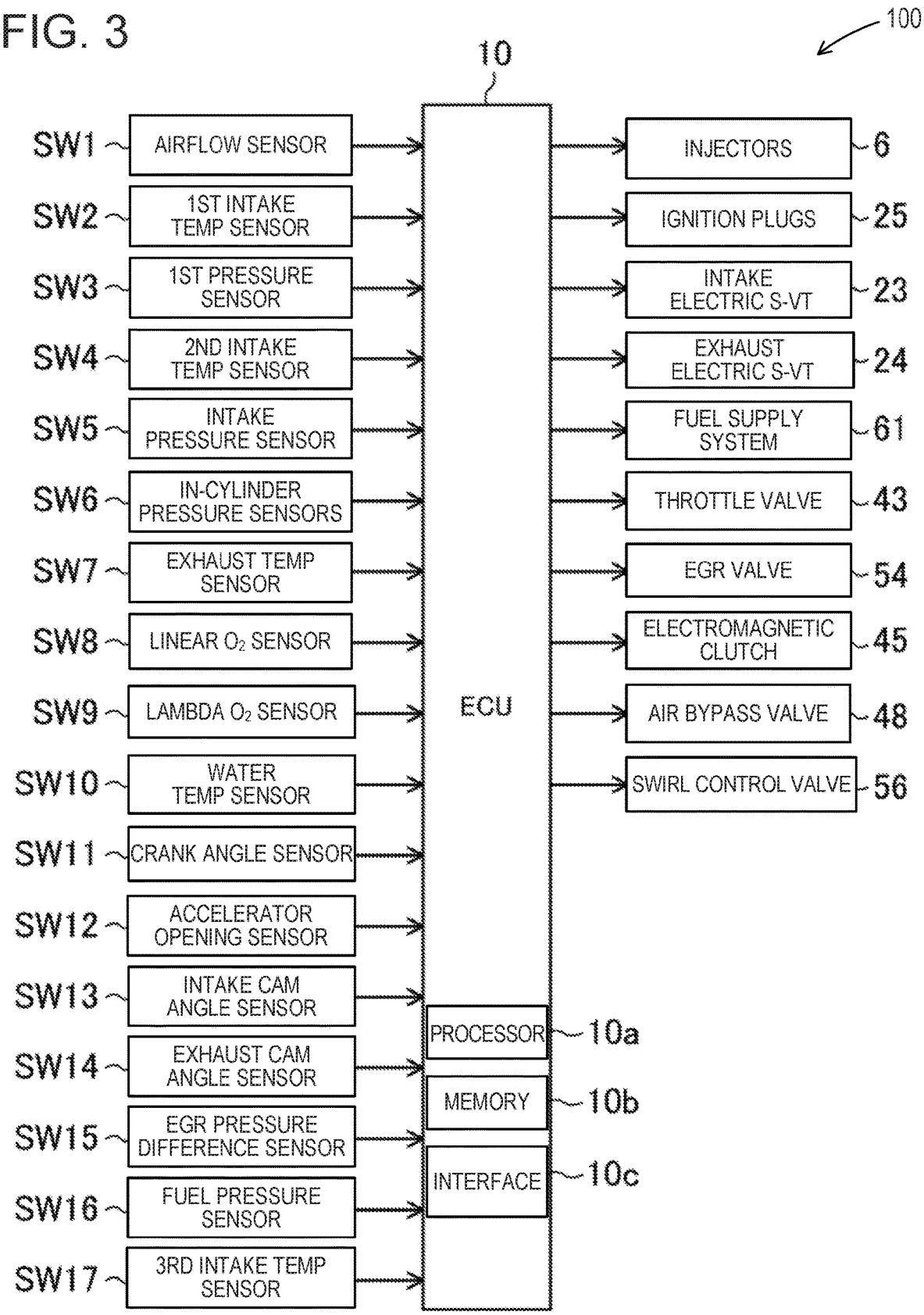
FIG. 3 is a block diagram illustrating a relationship between an ECU and its relevant apparatuses in a combustion control system.

The engine 1 has, as its variable valve operating mechanism, an intake electric S-VT (Sequential-Valve Timing) 23 (see FIG. 3). The intake electric S-VT 23 is continuously variable of a rotational phase of an intake camshaft within a given angular range. The open and close timings of the intake valve 21 continuously change. Note that the intake valve operating mechanism may have a hydraulic S-VT instead of the electric S-VT.

The cylinder head 13 is also formed with an exhaust port 19 for each cylinder 11. The exhaust port 19 also includes two exhaust ports. The exhaust port 19 communicates with the combustion chamber 17.

An exhaust valve 22 is disposed in the exhaust port 19. The exhaust valve 22 opens and closes the exhaust port 19 to and from the combustion chamber 17. The exhaust valve 22 is opened and closed by a valve operating mechanism at a given timing. This valve operating mechanism may be a variable valve operating mechanism which makes a valve timing and/or valve lift variable.

The engine 1 has, as its variable valve operating mechanism, an exhaust electric S-VT 24 (illustrated in FIG. 3). The exhaust electric S-VT 24 is continuously variable of a rotational phase of an exhaust camshaft within a given angular range. The open and close timings of the exhaust valve 22 continuously change. Note that the exhaust valve operating mechanism may have a hydraulic S-VT instead of the electric S-VT.

The intake electric S-VT 23 and the exhaust electric S-VT 24 adjust the length of an overlap period in which the intake valve 21 and the exhaust valve 22 both open. By adjusting the length of the overlap period to be longer, residual gas in the combustion chamber 17 is scavenged. Further, by adjusting the length of the overlap period, internal EGR (Exhaust Gas Recirculation) gas is introduced into the combustion chamber 17. The internal EGR system is constituted by the intake and exhaust electric S-VTs 23 and 24. Note that the internal EGR system is not necessarily constituted by the S-VT.

The injector (fuel injector) 6 is attached to the cylinder head 13 for each cylinder 11. The injector 6 injects the fuel directly into the combustion chamber 17. As illustrated in FIG. 2, the injector 6 is disposed in a valley portion of the pent roof where the inclined surface 1311 and the inclined surface 1312 intersect.

The injection axis X2 of the injector 6 is located on the exhaust side of the center axis X1 of the cylinder 11. The injection axis X2 of the injector 6 is parallel to the center axis X1. The injection axis X2 of the injector 6 coincides with the center of the cavity 31. The injector 6 is oriented toward the cavity 31.

Note that the injection axis X2 of the injector 6 may coincide with the center axis X1 of the cylinder 11. In this case, the injection axis X2 of the injector 6 may coincide with the center of the cavity 31.

Although not illustrated in detail, the injector 6 has a plurality of nozzle ports (10 ports in the engine 1). The nozzle ports are arranged at an even angular interval in the circumferential direction of the injector 6. Therefore, as indicated by two-dotted chain lines in FIG. 2, the injector 6 injects the fuel so that the fuel spray radially spreads from the radial center of the combustion chamber 17.

A fuel supply system 61 is connected to the injector 6. The fuel supply system 61 includes a fuel tank 63 and a fuel supply path 62 connecting the fuel tank 63 with the injector 6. The fuel tank 63 stores the fuel. A fuel pump 65 and a common rail 64 are provided in the fuel supply path 62.

The fuel pump 65 pumps the fuel to the common rail 64. For example, the fuel pump 65 is a plunger pump which is driven by the crankshaft 15. The common rail 64 stores the fuel pumped from the fuel pump 65 at high fuel pressure. When the injector 6 opens, the fuel stored in the common rail 64 is injected into the combustion chamber 17 from the injector 6.

The fuel supply system 61 is suppliable of the fuel at high pressure of 30 MPa or higher to the injector 6. The pressure of the fuel supplied to the injector 6 may be changed according to an operating state of the engine 1.

(Ignition Plug 25)

As illustrated in FIGS. 1 and 2, an ignition plug 25 is attached to the cylinder head 13 for each cylinder 11. The ignition plug 25 forcibly ignites the mixture gas in the combustion chamber 17. The ignition plug 25 is disposed at the intake side of the cylinder 11 with respect to the center axis X1. The ignition plug 25 is located between the two intake ports 18.

The ignition plug 25 is attached to the cylinder head 13 to extend downwardly, toward the center of the combustion chamber 17 in a tilted posture with respect to up-and-down directions of the cylinder head 13. The electrode of the ignition plug 25 is located near the ceiling surface of the combustion chamber 17 to be oriented toward inside the combustion chamber 17. Note that the ignition plug 25 may be disposed on the exhaust side of the center axis X1 of the cylinder 11. Moreover, the ignition plug 25 may be disposed on the center axis X1 of the cylinder 11.

(Intake Passage 40)

As illustrated in FIG. 1, an intake passage 40 is connected to one side of the engine 1. The intake passage 40 communicates with the intake ports 18 of the cylinders 11. Gas flowing in the intake passage 40 (intake air) is introduced into the combustion chamber 17.

An air cleaner 41 is disposed in an upstream end part of the intake passage 40. The air cleaner 41 filters fresh air. A surge tank 42 is disposed in a downstream end part of the intake passage 40. A part of the intake passage 40 downstream of the surge tank 42 forms independent passages branching for the respective cylinders 11. These passages connect with the intake ports 18 of the cylinders 11.

A throttle valve 43 adjustable of the opening is disposed in the intake passage 40 between the air cleaner 41 and the surge tank 42. The throttle valve 43 adjusts the amount of fresh air (air) into the combustion chamber 17.

A supercharger 44 is disposed in the intake passage 40 downstream of the throttle valve 43. The supercharger 44 boosts the intake air introduced into the combustion chamber 17. The supercharger 44 is a supercharger which is driven by the engine 1, for example, of a roots type, a Lysholm type, a vane type, or a centrifugal type.

The supercharger 44 is connected to the engine 1 via an electromagnetic clutch 45. The electromagnetic clutch 45 controls the transmission of a driving force from the engine 1 to the supercharger 44. The control of the electromagnetic clutch 45 is executed by the ECU 10. ON/OFF of the supercharger 44 is switched by the control of the electromagnetic clutch 45.

An intercooler 46 is disposed in the intake passage 40 downstream of the supercharger 44. The intercooler 46 cools the intake air compressed by the supercharger 44. The intercooler 46 may be, for example, of a hydraulically cooling type.

A bypass passage 47 is connected to the intake passage 40. In the intake passage 40, the bypass passage 47 connects a part upstream of the supercharger 44 to a part downstream of the intercooler 46. The bypass passage 47 bypasses the supercharger 44 and the intercooler 46. An air bypass valve 48 is disposed in the bypass passage 47. The air bypass valve 48 adjusts a flow rate of the intake gas flowing through the bypass passage 47.

When the supercharger 44 is turned off, the air bypass valve 48 is fully opened. The gas flowing through the intake passage 40 bypasses the supercharger 44 and is introduced into the combustion chamber 17 of the engine 1. The engine 1 operates in a non-boosted state, that is, in a naturally aspirated state.

When the supercharger 44 is turned on, the engine 1 operates in a boosted state. While the engine 1 operates in the boosting state, the ECU 10 adjusts the opening of the air bypass valve 48. Thus, the intake gas passed through the supercharger 44 partially flows back upstream of the supercharger 44 through the bypass passage 47.

When the ECU 10 adjusts the opening of the air bypass valve 48, the pressure of the intake air introduced into the combustion chamber 17 changes. In other words, the boosting pressure changes. Note that the term "boosted" may be defined as when the pressure in the surge tank 42 exceeds atmospheric pressure, and the term "non-boosted" may be defined as when the pressure in the surge tank 42 falls below the atmospheric pressure.

As illustrated in the white arrow in FIG. 2, the engine 1 generates a swirl flow inside the combustion chamber 17. As illustrated in FIG. 1, a swirl control valve (SCV) 56 is attached to the intake passage 40. Although not illustrated in detail, the SCV 56 is disposed in one of the two intake ports 18.

The SCV 56 is an opening controllable valve capable of adjusting an opening of a flow path. A smaller opening increases the swirl flow, and a larger opening weakens the swirl flow. The swirl flow is not generated at a full opening.

(Exhaust Passage 50)

An exhaust passage 50 is connected to another side of the engine 1 (opposite from the intake passage 40). The exhaust passage 50 communicates with the exhaust ports 19 of the cylinders 11. The exhaust passage 50 leads out the exhaust gas generated inside the combustion chamber 17. Although is not illustrated in detail, an upstream part of the exhaust passage 50 is branched for the respective cylinders 11. These independent passages are connected to the exhaust ports 19 of the cylinders 11, respectively.

An exhaust gas purification system having a plurality of catalytic converters 51U and 51D arranged in the flow direction is disposed in the exhaust passage 50. The upstream catalytic converter 51U is disposed in an engine bay (not illustrated) of the automobile and, as illustrated in FIG. 1, has a three-way catalyst 511 and a gasoline particulate filter (GPF) 512.

The downstream catalytic converter 51D is disposed outside the engine bay and has a three-way catalyst 513. Note that the GPF 512 may be omitted, and the catalytic converters 51U and 51D are not limited to have the three-way catalyst 511 and 513. Moreover, the order of arrangements of the three-way catalyst 511 and the GPF 512 may suitably be changed.

(EGR Passage 52 and EGR Valve 54)

An EGR passage 52 is connected between the intake passage 40 and the exhaust passage 50. The EGR passage 52 circulates a part of the exhaust gas to the intake passage 40. Therefore, the intake air may also contain the exhaust gas in addition to the fresh air.

An upstream end of the EGR passage 52 is connected to the exhaust passage 50 between the upstream and downstream catalytic converters 51U and 51D. A downstream end of the EGR passage 52 is connected to the intake passage 40 upstream of the supercharger 44. The exhaust gas flowing through the EGR passage 52 enters the intake passage 40 from the upstream side of the supercharger 44, without passing through the air bypass valve 48 of the bypass passage 47.

A water-cooling type EGR cooler 53 is disposed in the EGR passage 52. The EGR cooler 53 cools the exhaust gas. Moreover, an EGR valve 54 is disposed in the EGR passage 52. The EGR valve 54 adjusts the amount of the exhaust gas flowing through the EGR passage 52. In other words, the EGR valve 54 adjusts an amount of the cooled exhaust gas recirculated into the intake passage 40 (external EGR gas). The temperature of the intake air is adjusted by controlling the amount of the external EGR gas.

(ECU)

The ECU 10 is a controller based on a well-known microcomputer, and as illustrated in FIG. 3, it includes a processor (e.g., a central processing unit (CPU)) 10a which executes a program, memory 10b storing the programs and data, and an interface 10c (e.g., an input/output bus) which transmit and receives electric signals. The memory 10b stores a control logic used for a certain control (described later in detail), a map, etc.

As illustrated in FIGS. 1 and 3, the ECU 10 is connected to various sensors SW1 to SW17. Each of the sensors SW1 to SW17 outputs detected information as electric signals, into the ECU 10 via the interface 10c. The following provides descriptions of these sensors SW1 to SW17.

Airflow sensor SW1: Disposed in the intake passage 40 downstream of the air cleaner 41 and detects the flow rate of the fresh air therein;

First intake temperature sensor SW2: Disposed in the intake passage 40 downstream of the air cleaner 41 and detects the temperature of the fresh air therein;

First pressure sensor SW3: Disposed at a position of the intake passage 40 downstream of the connecting position to the EGR passage 52 and upstream of the supercharger 44, and detects the pressure of the gas flowing into the supercharger 44;

Second intake temperature sensor SW4: Disposed at a position of the intake passage 40 downstream of the supercharger 44 and upstream of the connecting position to the bypass passage 47, and detects the temperature of the gas flowed out of the supercharger 44;

Intake pressure sensor SW5: Attached to the surge tank 42, and detects the pressure of the gas flowing downstream of the supercharger 44;

In-cylinder pressure sensor SW6: Attached to the cylinder head 13 corresponding to each of the cylinder 11, and detects the pressure inside the combustion chamber 17 (in-cylinder pressure);

Exhaust temperature sensor SW7: Disposed in the exhaust passage 50, and detects the temperature of the exhaust gas discharged from the combustion chamber 17;

Linear $O_2$ sensor SW8: Disposed in the exhaust passage 50 upstream of the upstream catalytic converter 51U, and detects an oxygen concentration within the exhaust gas;

Lambda $O_2$ sensor SW9: Disposed in the upstream catalytic converter 51U downstream of the three-way catalyst 511, and detects an oxygen concentration within the exhaust gas;

Water temperature sensor SW10: Attached to the engine 1, and detects a temperature of the cooling water;

Crank angle sensor SW11: Attached to the engine 1, and detects a rotational angle of the crankshaft 15;

Accelerator opening sensor SW12: Attached to an accelerator pedal mechanism, and detects an accelerator opening corresponding to an operated amount of an accelerator pedal;

Intake cam angle sensor SW13: Attached to the engine 1, and detects a rotational angle of the intake camshaft;

Exhaust cam angle sensor SW14: Attached to the engine 1, and detects a rotational angle of the exhaust camshaft;

EGR pressure difference sensor SW15: Disposed in the EGR passage 52, and detects a difference in pressure between positions upstream and downstream of the EGR valve 54;

Fuel pressure sensor SW16: Attached to the common rail 64 of the fuel supply system 61, and detects the pressure of the fuel to be supplied to the injector 6; and Third intake temperature sensor SW17: Attached to the surge tank 42, and detects temperature of the gas within the surge tank 42, i.e., the temperature of the intake air introduced into the combustion chamber 17.

The ECU 10 determines the operating state of the engine 1 based on the electric signals (detection signals) of various detection values inputted from the sensors SW1 to SW17. Then the ECU 10 calculates a target amount and/or a control amount of each device according to the control logic by suitably using the map.

The ECU 10 outputs electric signals corresponding to the calculated control amounts to the injector 6, the ignition plug 25, the intake electric S-VT 23, the exhaust electric S-VT 24, the fuel supply system 61, the throttle valve 43, the EGR valve 54, the electromagnetic clutch 45 of the supercharger 44, the air bypass valve 48, and the SCV 56 via the interface 10c. Thus, the ECU 10 comprehensively controls these devices.

(Concept of SPCCI Combustion)

The engine 1 performs combustion by compression self-ignition in a given operating state in order to improve fuel efficiency and exhaust gas performance. In the combustion caused by self-ignition, the timing of the self-ignition changes greatly if the temperature inside the combustion chamber 17 varies before the compression starts. Therefore, the engine 1 performs the SPCCI combustion in which the SI combustion and the CI combustion are combined.

In the SPCCI combustion, the ignition plug 25 forcibly ignites the mixture gas to cause the SI combustion and the CI combustion (partial compression-ignition combustion).

It is possible to reduce the variation of the temperature inside the combustion chamber 17 before the compression starts by adjusting the heat generation amount in the SI combustion. It is possible to self-ignite the mixture gas at a target timing by the ECU 10 adjusting the ignition timing.

Figure 4:
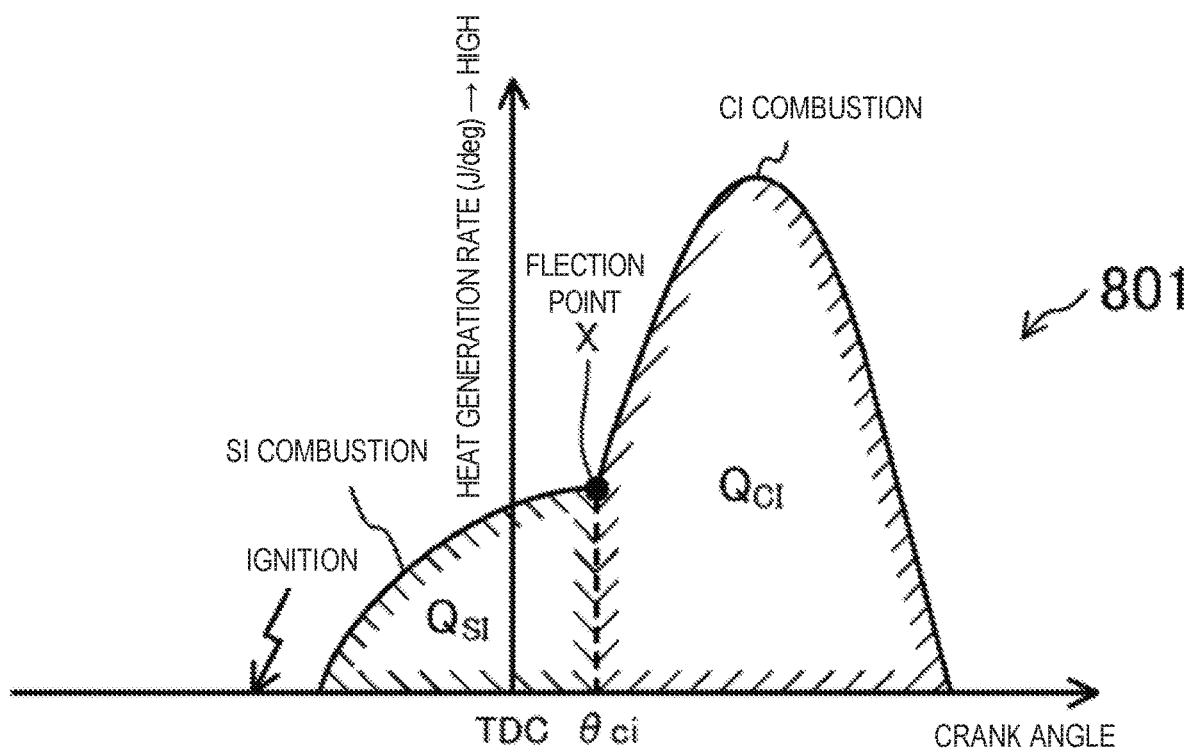
FIG. 4 is a view illustrating a waveform of SPCCI combustion.

In the SPCCI combustion, the heat generation in the SI combustion is slower than the heat generation in the CI combustion. As illustrated in FIG. 4, in a waveform of a heat generation rate $(dQ/d\theta)$ of the SPCCI combustion, SI combustion has a shallower rising slope than that of the CI combustion. Moreover, a pressure fluctuation $(dp/d\theta)$ in the combustion chamber 17 is gentler in the SI combustion than in the CI combustion.

When the unburned mixture gas self-ignites after the SI combustion starts, the slope of the waveform of the heat generation rate may become steeper at the self-ignition timing. The waveform of the heat generation rate may have a flection point X at a timing $\theta ci$ when the CI combustion starts.

After the CI combustion starts, the SI combustion and the CI combustion are performed in parallel. In the CI combustion, since the heat generation is larger than in the SI combustion, the heat generation rate becomes relatively high. However, since the CI combustion is performed after CTDC, the slope of the waveform of the heat generation rate is avoided from becoming excessively steep. Further, the pressure fluctuation $(dp/d\theta)$ in the CI combustion also becomes relatively shallow.

The pressure fluctuation $(dp/d\theta)$ may be used as an index expressing combustion noise. Since the SPCCI combustion reduces the pressure fluctuation $(dp/d\theta)$, excessive combustion noise is avoided. Therefore, combustion noise of the engine 1 is reduced below an allowable value.

The SPCCI combustion ends by finishing the CI combustion. The CI combustion has a shorter combustion period than in the SI combustion. The SPCCI combustion advances the combustion end timing compared to the SI combustion.

The heat generation rate waveform of the SPCCI combustion is formed to have a first heat generation rate portion $Q_{SI}$ formed by the SI combustion and a second heat generation rate portion $Q_{CI}$ formed by the CI combustion, which are next to each other in this order.

Here, an SI ratio is defined as a parameter indicating a property of the SPCCI combustion. The SI ratio is defined as an index relating to a ratio of the heat amount generated by the SI combustion with respect to a total heat amount generated by the SPCCI combustion. The SI ratio is a heat volume ratio resulted from two combustions with different combustion modes.

The ratio of the SI combustion is high when the SI ratio is high, and the ratio of the CI combustion is high when the SI ratio is low. The high ratio of the SI combustion in the SPCCI combustion is advantageous in reducing combustion noise. The high ratio of the CI combustion in the SPCCI combustion is advantageous in improving fuel efficiency of the engine 1.

The SI ratio may be defined as a ratio of the heat amount generated by the SI combustion with respect to the heat amount generated by the CI combustion. In other words, in the SPCCI combustion, when the crank angle at which the CI combustion starts is a CI combustion start timing $\theta ci$, based on a waveform 801 illustrated in FIG. 5 defining an area $Q_{SI}$ of the SI combustion advancing from $\theta ci$ and an area $Q_{CI}$ of the CI combustion including $\theta ci$ and retarding from the $\theta ci$, the SI ratio may be $Q_{SI}/Q_{CI}$.

(Control Logic of Engine 1)

As described above, the ECU 10 operates the engine 1 according to the control logic stored in the memory 10b.

That is, the ECU 10 determines the operating state of the engine 1 based on the electric signals inputted from the various sensors SW1 to SW17, and sets a target torque. Further, the ECU 10 performs calculations in order to adjust a property inside the combustion chamber 17, the fuel injection amount, the fuel injection timing, and the ignition timing, so that the engine 1 outputs the target torque.

The ECU 10, when performing the SPCCI combustion, controls the SPCCI combustion by using two parameters of the SI ratio and $\theta ci$. For example, the ECU 10 determines a target SI ratio and a target $\theta ci$ corresponding to the operating state of the engine 1. Further, the ECU 10 adjusts the temperature inside the combustion chamber 17 and the ignition timing to bring the actual SI ratio to the target SI ratio and the actual $\theta ci$ to the target $\theta ci$.

The ECU 10 sets the target SI ratio low when the engine load is low, and sets the target SI ratio high when the engine load is high. When the engine load is low, the ratio of the CI combustion in the SPCCI combustion is increased to achieve both combustion noise reduction and fuel efficiency improvement. When the engine load is high, the ratio of the SI combustion in the SPCCI combustion is increased to be advantageous in reducing combustion noise.

(Operating Range of Engine 1)

Figure 5:
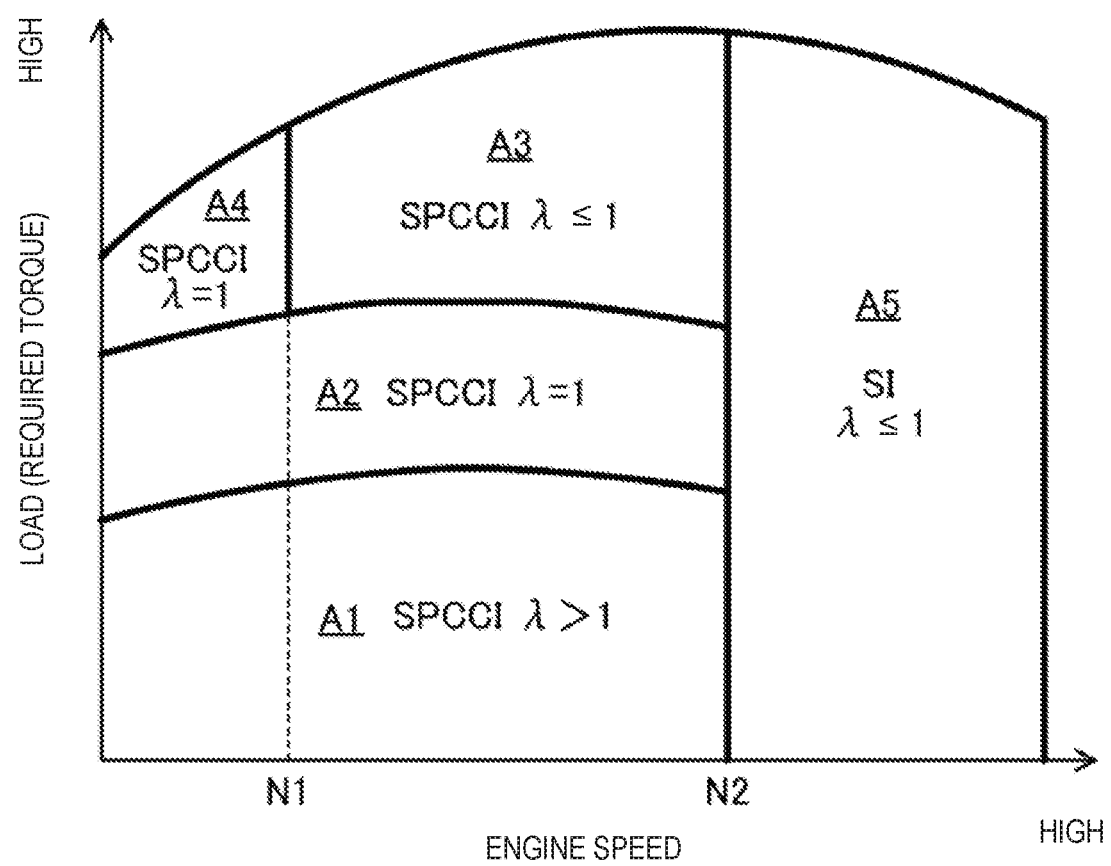
FIG. 5 is one example of a map regarding a combustion control of the engine.

FIG. 5 illustrates a map (in a warmed-up state) according to the combustion control of the engine 1. The map is stored in the memory 10b of the ECU 10 as described above. The map is roughly divided into five ranges based on the engine load and the engine speed.

For example, the five ranges include: a low load range A1, a medium load range A2 (a range in which the engine load is higher than the low load range A1), a high-load medium-speed range A3 (a range in which the engine load is higher than the medium load range A2 and the engine speed is medium), a high-load low-speed range A4 (a range in which the engine load is higher than the medium load range A2 and the engine speed is lower than the high-load medium-speed range A3), and a high speed range A5.

Figure 6:
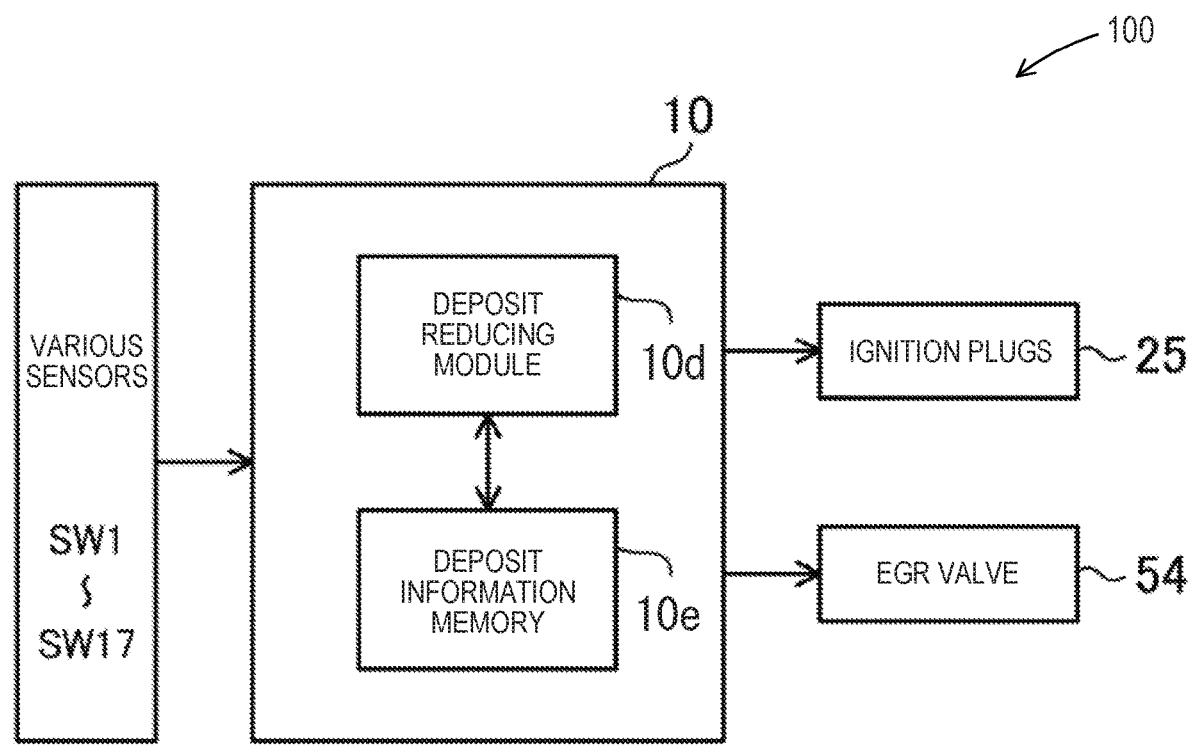
FIG. 6 is a block diagram illustrating a functional relation between the ECU and relevant apparatuses in the combustion control system, related to a reducing control of deposit.

The low speed, the medium speed, and the high speed herein may be defined by substantially evenly dividing, in the engine speed direction, the entire operating range of the engine 1 into three ranges of the low speed, the medium speed and the high speed. In the example of FIG. 6, the engine speed lower than a speed N1 is defined as low, the engine speed higher than a speed N2 is defined as high, and the engine speed between the engine speeds N1 and N2 is defined as medium. For example, the speed N1 may be about 1,200 rpm and the speed N2 may be about 4,000 rpm.

Further, it may be defined such that the low load range includes an idle operation, the high load range includes an operating state of the full engine load, and the medium load range is between the low load range and the high load range.

Moreover, the low load, the medium load, and the high load herein may be defined by substantially evenly dividing, in the engine load direction, the entire operating range of the engine 1 into three ranges of the low load, the medium load and the high load.

The engine 1 performs the SPCCI combustion within the low load range A1, the medium load range A2, the high-load medium-speed range A3, and the high-load low-speed range A4. The engine 1 also performs the SI combustion within the high speed range A5.

An air-fuel ratio (A/F) of the mixture gas is set lean within the low load range A1 ($\lambda>1$). Within the medium load range A2 and the high-load low-speed range A4, the air-fuel ratio is substantially set to the stoichiometric air-fuel ratio ($\lambda=1$). Within the high-load medium-speed range A3 and the high speed range A5, the air-fuel ratio is substantially set to one of the stoichiometric air-fuel ratio and a rich state ($\lambda \leq 1$). Note that $\lambda$ corresponds to an excess air ratio ($\lambda=1$: stoichiometric air-fuel ratio).

(Control of EGR Valve 54)

The opening of the EGR valve 54 is controlled such that the SPCCI combustion is suitably performed. That is, the ECU 10 controls the opening of the EGR valve 54 to adjust the amount of the external EGR gas recirculating back to the intake passage 40. As a result, the temperature inside the combustion chamber 17 is adjusted to achieve the target SI ratio and the target $\theta ci$.

Within the low load side range of the operating range of the engine 1, e.g., during the idling operation in which the combustion is weak and the temperature inside the combustion chamber 17 is low, when a large amount of the external EGR gas is introduced, the target SI ratio and the target $\theta ci$ may not be achieved. Therefore, in this case, the introduction amount of the external EGR gas is reduced (reduced to zero depending on the situation).

Further, a large amount of air is required within the operating range in which the required torque is large, e.g., at the full load. Therefore, in this case, the introduction amount of the external EGR gas is reduced (reduced to zero depending on the situation).

In the engine 1, the external EGR gas is introduced within a wide operating range, excluding such limited ranges described above. The automobile frequently uses the low load range A1, the medium load range A2 and their surrounding ranges to travel. Within these operating ranges, a relatively large amount of external EGR gas is introduced.

<Knocking Reduction Control>

The ECU 10 reduces combustion noise (knocking) according to the control logic. That is, since the SPCCI combustion is a combustion mode combining the SI combustion and the CI combustion, knocking caused by the SI combustion (SI knock) and knocking caused by the CI combustion (CI knock) may occur. The ECU 10 prevents these knocking by the manner of executing a control.

The SI knock is a phenomenon in which the unburned gas outside the area where the SI combustion of the mixture gas occurs combusts rapidly by abnormal, local self-ignition (local self-ignition which is clearly different from normal CI combustion). The CI knock is a phenomenon in which main components of the engine 1, e.g., the cylinder block 12, resonate due to a pressure fluctuation by the CI combustion.

The SI knock occurs as loud noise at a frequency of approximately 6.3 kHz due to an organ pipe oscillation generated inside the combustion chamber 17. On the other hand, the CI knock occurs as loud noise at a frequency within a range of approximately 1 to 4 kHz (more specifically, a plurality of frequencies included in this range) by the resonance. Thus, the SI knock and the CI knock occur as noises at different frequencies caused by different reasons.

The ECU 10 controls the SPCCI combustion so that both the SI knock and the CI knock do not occur. For example, the ECU 10 performs the Fourier transform on the detection signal of the in-cylinder pressure sensor SW6 to calculate an SI knock index value related to the SI knock and a CI knock index value related to the CI knock.

The SI knock index value is an in-cylinder pressure spectrum near 6.3 kHz increasing as the SI knock occurs. The CI knock index value is an in-cylinder pressure spectrum near 1 to 4 kHz increasing as the CI knock occurs.

The ECU 10 determines a $\theta ci$ limit such that neither of the SI and CI knock index values exceeds the $\theta ci$ limit, according to a given map. Moreover, the ECU 10 compares $\theta ci$ determined based on the operating state of the engine 1, with the $\theta ci$ limit. In this manner, the ECU 10 determines $\theta ci$ to be the target $\theta ci$ if the $\theta ci$ limit is the same as or advancing than $\theta ci$. On the other hand, when the $\theta ci$ limit is retarding than $\theta ci$, the ECU 10 determines the $\theta ci$ limit to be the target $\theta ci$.

The ECU 10 also executes the above control in the SPCCI combustion control, so as to prevent the SI knock and the CI knock.

<Reduction Control of Pre-Ignition>

The ECU 10 performs a control to reduce an abnormal combustion phenomenon (pre-ignition) in which combustion starts before ignition, according to a control logic.

Meanwhile, during combustion, although it is a minute amount, fuel and engine oil adhere to an upper surface of the piston 3 which defines the combustion chamber 17. Over time, "deposits" are generated by the adhered matter gradually accumulates with a little amount each time.

It is known that this deposit is a cause of the pre-ignition. Therefore, in this engine 1, the ECU 10 performs a reducing control of the deposit so as to reduce the deposit.

FIG. 6 illustrates the combustion control system 100, showing a functional relation between the ECU 10 and relevant apparatuses, related to the reducing control of deposit. The ECU 10 has a deposit reducing module 10$d$ and a deposit information memory 10$e$. The processor 10$a$ executes the deposit reducing module 10$d$ to perform a control to reduce the deposit accumulated inside the combustion chamber 17, and the deposit reducing module 10$d$ is stored in the memory 10$b$ as software. The deposit information memory 10$e$ stores information used for the reducing control of deposit. The information used for the reducing control of deposit is outputted and inputted between the deposit reducing module 10$d$ and the deposit information memory 10$e$.

Although the detail will be described later, the deposit reducing module 10$d$ collaborates with the deposit information memory 10$e$ to perform a deposit amount estimation control to estimate an accumulating amount of deposit, and a deposit removal control to remove the deposit.

In the deposit amount estimation control, a deposit increasing amount estimation processing in which an increasing amount of the deposit which changes with time is estimated based on a surface temperature of the piston 3, and a deposit decreasing amount estimation processing in which a decreasing amount of the deposit which changes with time is estimated based on an SI knocking index value are performed. Then, a total accumulating amount of deposit is estimated based on the increasing amount and the decreasing amount of deposit.

In the deposit removal control, knocking is caused during combustion and the accumulated deposit is removed by the impact. However, in this engine 1, in order to cause the knocking, the deposit reducing module 10d controls the ignition plug 25 to ignite and combust the mixture gas, and controls the EGR valve 54 to decrease an amount of external EGR gas introduced into the combustion chamber 17. In detail, an EGR rate (a rate of the amount of external EGR gas to the entire mixture gas amount inside the combustion chamber 17) is corrected to be smaller.

When the amount of external EGR gas introduced into the combustion chamber 17 becomes less, the air amount increases accordingly. As described above, in this engine 1, the parameters, such as the SI ratio, are controlled so that the optimal combustion is performed, in addition to the reducing control of the knocking. The knocking can be caused when the air amount is increased under the condition of realizing such an optimal combustion. By adjusting a correcting amount of the EGR rate, the occurrence of the knocking can be stabilized.

The adjustment of the EGR rate can be carried out in a wide operating range of the engine 1. That is, even in the low-load operating range, the occurrence of the knocking can be stabilized.

(Relation Between Knocking and Deposit Removal Effect)

When examining the technology disclosed, the inventors conducted an experiment and examined the influence of the knocking on the deposit.

Figure 7:
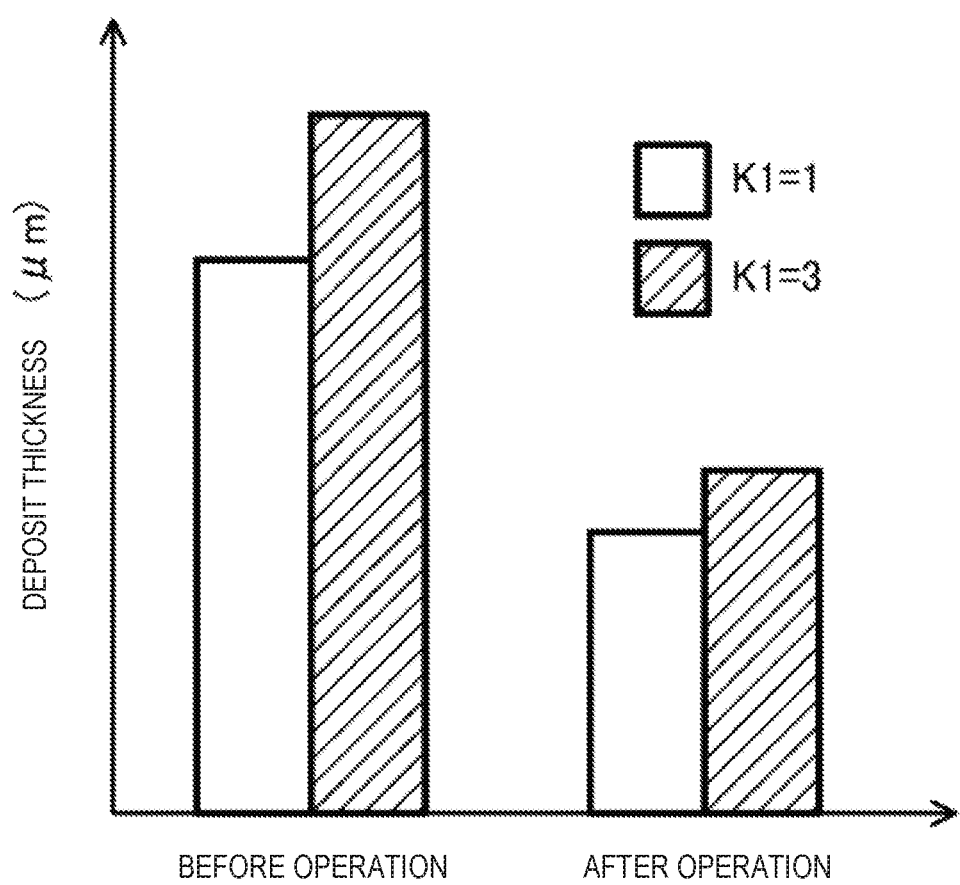
FIG. 7 is a graph illustrating a relation between a knocking and a deposit removal effect.

In this experiment, two engines where the deposit is accumulated on the piston were used, and each engine was operated normally for 30 minutes, while causing given knockings having different intensities. FIG. 7 illustrates experimental results.

In both a condition in which the intensity of the knocking is low (KI=1) and a condition in which the intensity of the knocking is high (KI=3), the thickness of the deposit decreased after the operation, as compared with the thickness before the operation (substantially decreased in half). Therefore, it was confirmed that the deposit is removable by the knocking.

It was also confirmed that there is almost no difference in the removal effect of the deposit according to the difference in the intensity of the knocking. Therefore, it was confirmed that the deposit is removable even if the intensity of the knocking is low, because the intensity of the knocking has little influence on the deposit removal effect.

From these results, the deposit reducing module 10d controls so that a weak knocking occurs, without causing a strong knocking which may cause an uncomfortableness for the occupants of the automobile to occur, when performing the deposit removal control. This also becomes advantageous to the deposit removal by the knocking in the low-load operating range.

Moreover, in the deposit decreasing amount estimation processing in which the decreasing amount of deposit is estimated, although the deposit reducing module 10d calculates the decreasing amount of deposit corresponding to each knocking, it also becomes advantageous in that it is not necessary to use a complicated map in that case. In detail, the deposit information memory 10e stores a table (deposit removal table) where an SI knocking index value at which the removal of the deposit becomes possible, and an amount of deposit which decreases by the knocking are associated with each other.

As described above, in this engine 1, the external EGR gas is introduced in the wide operating range. In the deposit removal control described above, since only the EGR rate is corrected, the correction can be performed in the wide operating range, without being limited.

However, in the high-load operating range, since the fuel and air amounts increase, combustion tends to become intensive. Therefore, the knocking naturally occurs also during the normal combustion. Especially, since this engine 1 has a high geometric compression ratio and it is boosted in the high-load operating range, it tends to cause a strong knocking. Therefore, in this engine 1, the ECU 10 performs the reducing control of knocking, as described above.

Figure 8:
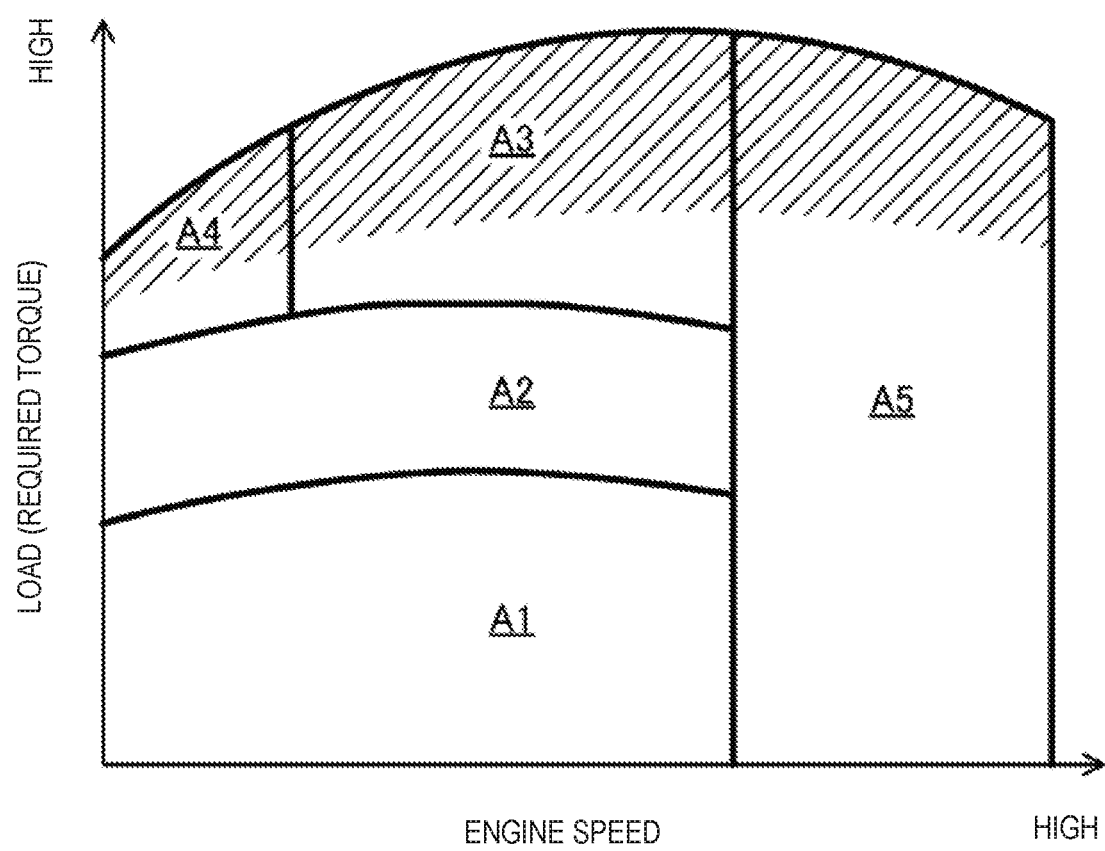
FIG. 8 is one example of a map related to the deposit removal control.

Thus, the ECU 10 limits the execution of the deposit removal control at a load range higher than a given load in the operating range of the engine 1 so that a strong knocking does not occur. In detail, as illustrated in FIG. 8, the deposit information memory 10e stores a map (deposit control range map) corresponding to the operating range of the engine 1. The range illustrated by an oblique hatching in the map of FIG. 8 corresponds to an execution limited range where the execution of the deposit removal control is limited.

A lower limit of the execution limited range is suitably changed according to the specification of the engine 1. The lower limit of the execution limited range may be varied according to each operating range, or may be varied according to the engine speed. The deposit reducing module 10d refers to this map when performing the deposit removal control. The deposit reducing module 10d does not perform the deposit removal control, while the engine 1 operates in the execution limited range. On the other hand, the deposit removal control is performed when the engine 1 does not operate in the execution limited range.

(Relation Between Accumulation of Deposit and Temperature)

The deposit is comprised of adhered matter, such as fuel and engine oil. Generally, when the temperature is high, the ingredient originated from the engine oil increases, and on the other hand, when the temperature is low, the ingredient originated from the fuel increases. Since the ingredient of the deposit differs depending on the temperature, the inventors conducted an experiment and investigated for the influence of the temperature on the accumulation of the deposit.

Figure 9:
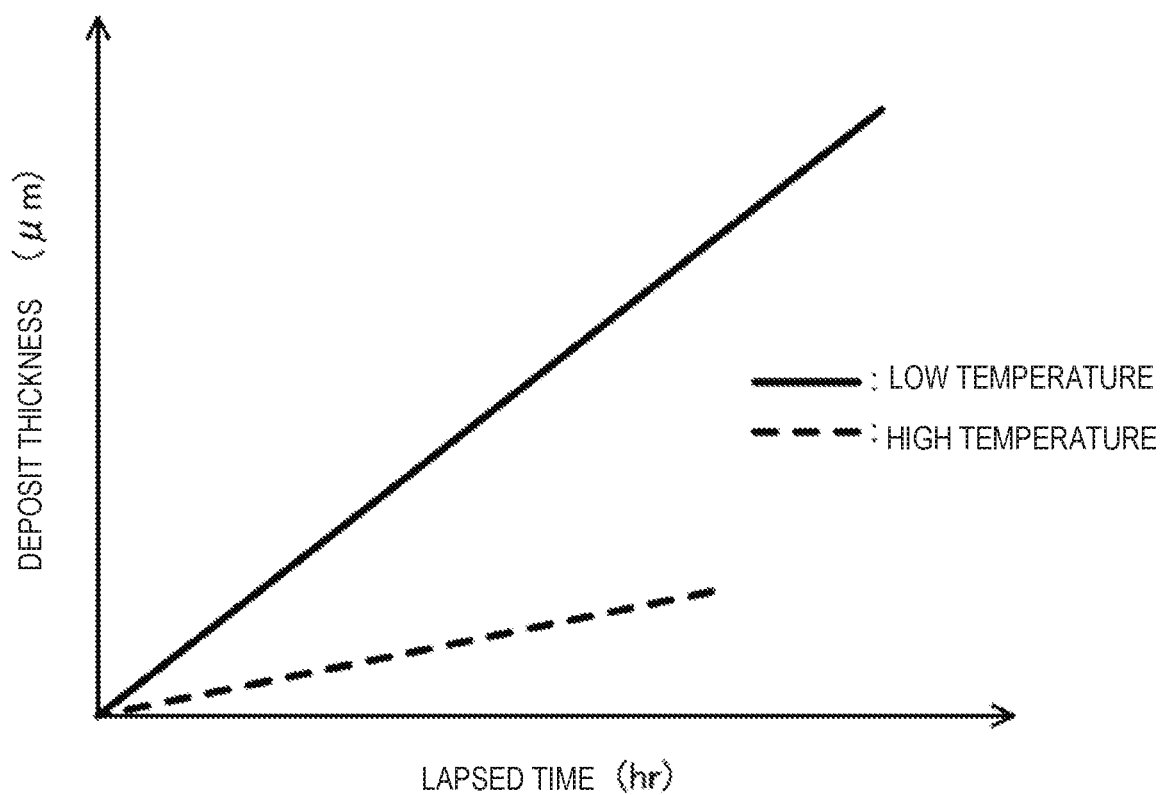
FIG. 9 is a graph illustrating a relation between accumulation of deposit and temperature.

In this experiment, two engines provided with unused pistons were used, and the two engines were operated so that the surface temperatures of the pistons become a given low temperature and a given high temperature. Then, the thicknesses of the deposit generated on the surfaces of the pistons were measured over time. The experimental result is illustrated in FIG. 9.

It was confirmed that there is a difference in the change of the deposit accumulation between a condition in which the surface temperature of the piston is low (solid line), and a condition in which the surface temperature of the piston is high (dashed line). Under the condition in which the surface temperature of the piston is low, an accumulating speed of the deposit was higher than the condition in which the surface temperature of the piston is high, and thereby, it was confirmed that the deposit tends to be accumulated.

Therefore, the ECU 10 takes the influence of the temperature into consideration upon the deposit amount estimation control to estimate the accumulating amount of deposit. In detail, as illustrated in FIG. 10, in the deposit information memory 10e, a given map (deposit accumulation map) corresponding to the surface temperature of the piston 3 is stored.

Figure 10:
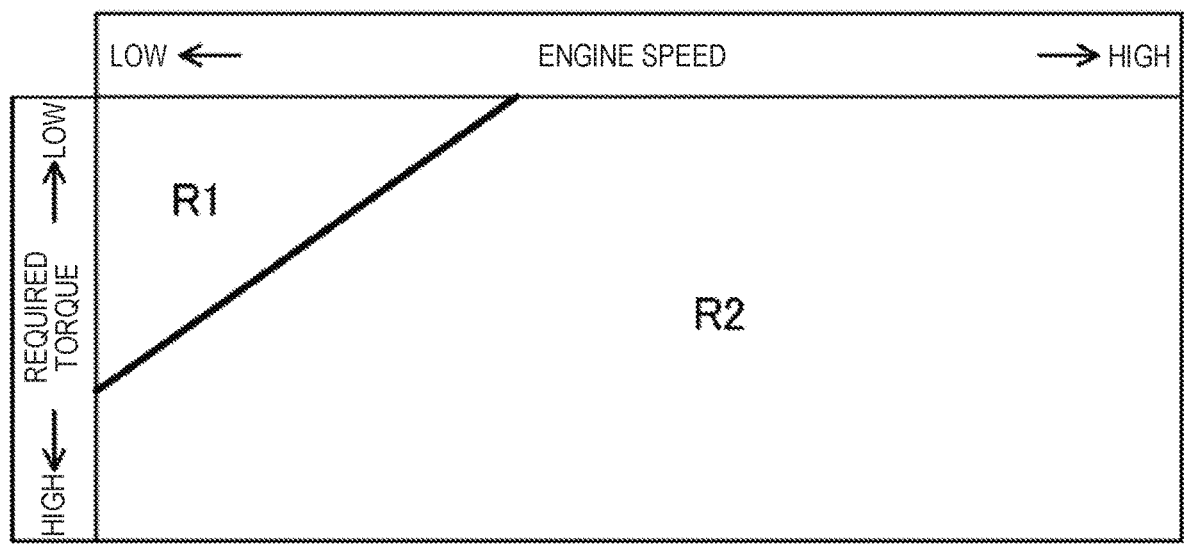
FIG. 10 is one example of a map related to the deposit removal control.

In the map of FIG. 10, the vertical axis indicates a required torque, and the horizontal axis indicates the engine speed of the engine 1. The surface temperature of the piston 3 estimated corresponding to each of the required torque and the engine speed is illustrated in this map. The map is set beforehand by an experiment, etc.

This map is divided into a low-temperature range R1 and a high-temperature range R2 based on the experimental data described above. The deposit reducing module 10d refers to this map when performing the deposit increasing amount estimation processing in which the increasing amount of deposit is estimated. Then, the deposit reducing module 10d uses the accumulating speed corresponding to the low-temperature range R1 for the calculation when the engine 1 operates in the low-temperature range R1. On the other hand, when the engine 1 operates in the high-temperature range R2, the accumulating speed corresponding to the high-temperature range R2 is used for the calculation.

Note that the division of the map of FIG. 10 is merely illustration. The map may be divided into three or more ranges. Linear interpolation, etc. may be performed between the ranges.

(Specific Example of Deposit Reducing Control)

Figure 11:
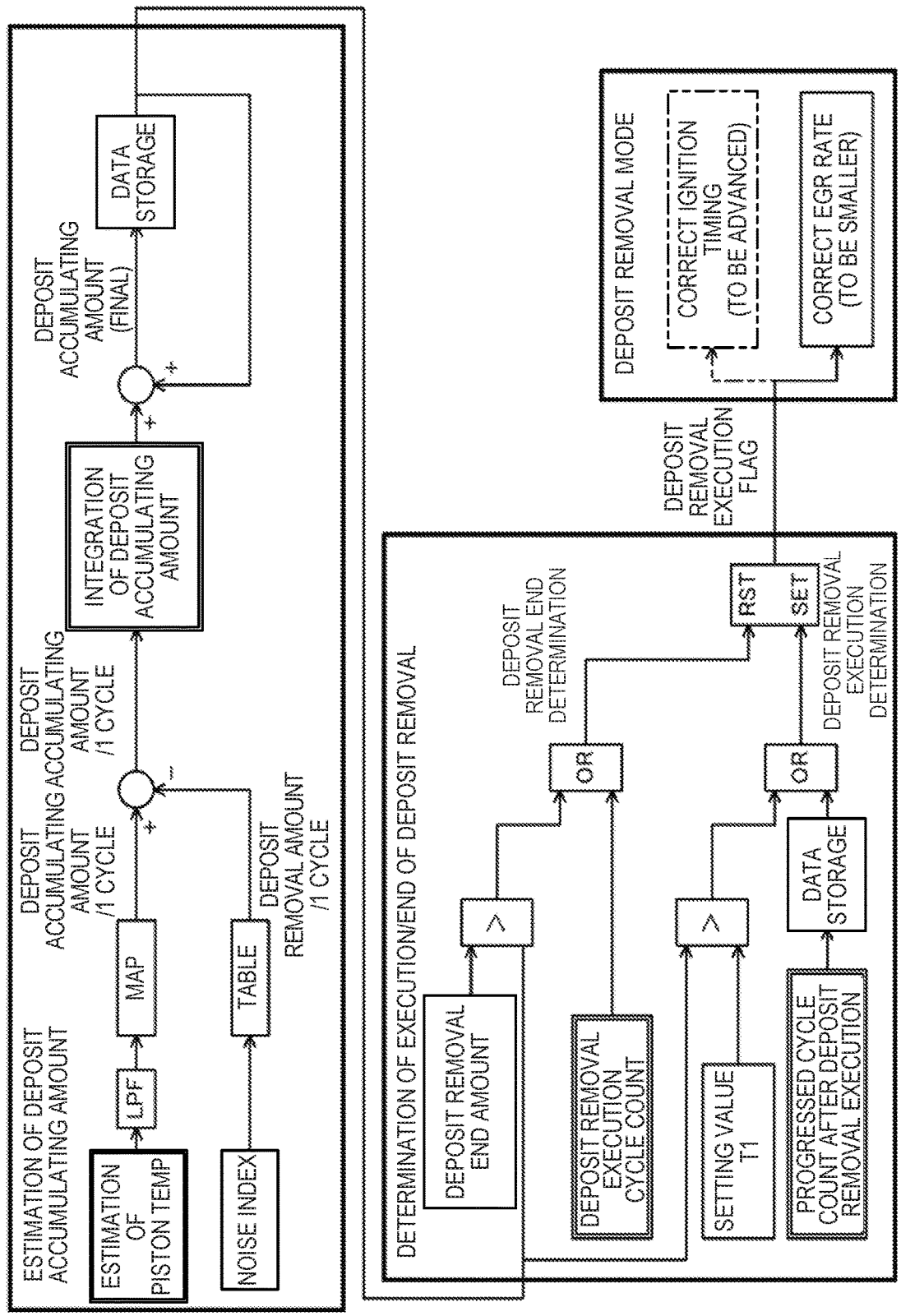
FIG. 11 is one example of control blocks related to a reducing control of deposit.
Figure 12A:
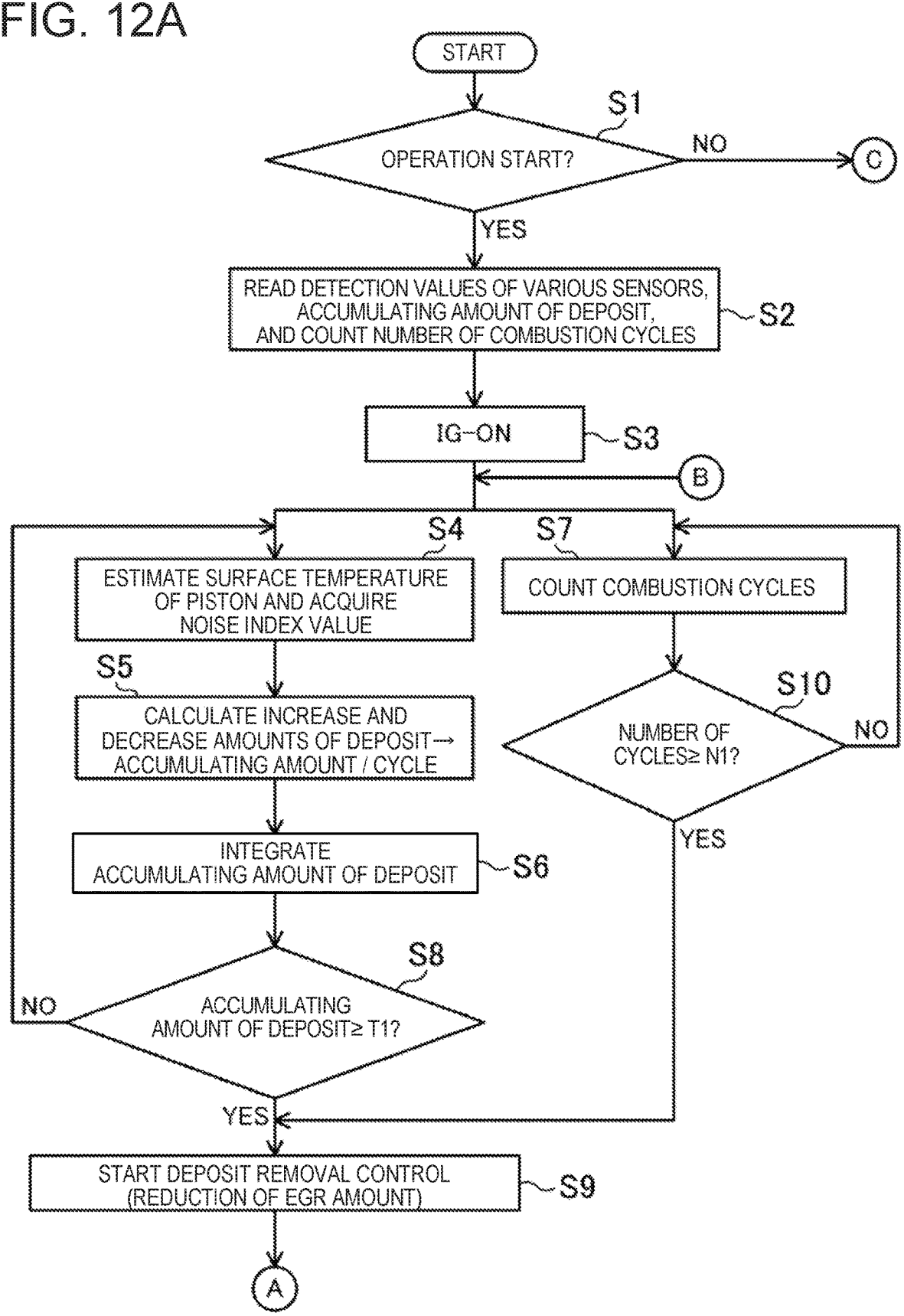
FIG. 12A is one example of a flowchart of the reducing control of deposit.
Figure 12B:
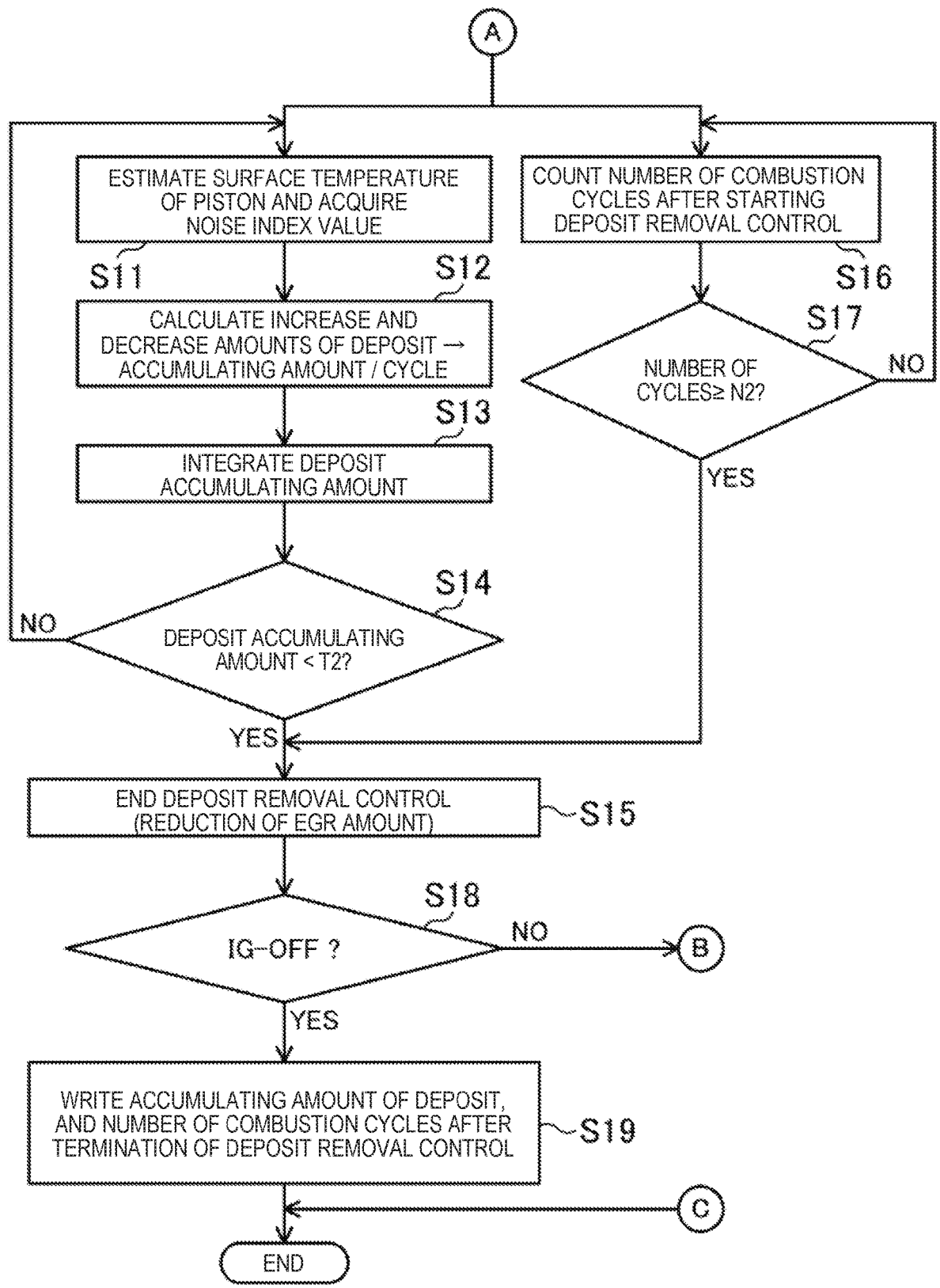
FIG. 12B is a flowchart following FIG. 12A.

FIG. 11 illustrates one example of a control block related to the reducing control of deposit. FIGS. 12A and 12B illustrate one example of a flowchart of the reducing control of deposit corresponding to the control block of FIG. 11.

As illustrated in FIG. 12A, when operation of the automobile is started (YES at Step S1), the ECU 10 reads the detection values inputted from the various sensors SW1-SW17, the accumulating amount of deposit stored in the memory 10b (deposit information memory 10e), and a count number of combustion cycles (Step S2).

When the ignition switch is turned on, the engine 1 starts (Step S3). Thereby, since combustion starts inside the combustion chamber 17, the ECU 10 starts the reducing control of deposit. That is, the deposit amount estimation control to estimate the accumulating amount of deposit is performed.

In detail, the ECU 10 (deposit reducing module 10d) performs processings, for every combustion cycle, to estimate the surface temperature of the piston 3 and acquire a noise index (SI knocking index value) (Step S4). The estimation of the surface temperature of the piston 3 is determined based on the operating state of the engine 1 (required torque, engine speed) determined from the detection values inputted from the various sensors SW1-SW17. The SI knocking index value is calculated based on the detection value of the in-cylinder pressure sensor SW6, as described above.

As illustrated in FIG. 11, when the surface temperature of the piston 3 is estimated in each combustion cycle, since the surface temperature of the piston 3 does not change rapidly, the ECU 10 removes noise components by using a low pass filter (LPF) to adjust the numerical value data. Then, by comparing the numerical value data with the map (deposit accumulation map) stored in the memory 10b (deposit information memory 10e), the amount of deposit (increasing amount) to be accumulated in the combustion cycle is calculated.

For example, when the operating range of the engine 1 corresponding to the estimated surface temperature of the piston 3 is the high-temperature range R2, the accumulating amount of deposit in the combustion cycle is calculated using the corresponding accumulating speed. Note that this series of processings is an example of a deposit amount increasing processing.

When the SI knocking index value for each combustion cycle is acquired, the ECU 10 compares the SI knocking index value with the table (deposit removal table) stored in the memory 10b (deposit information memory 10e) to determine whether the deposit is removed in the combustion cycle, and to calculate the decreasing amount of deposit if the deposit is removed. Note that this series of processings is an example of a deposit amount decreasing processing.

Then, the ECU 10 calculates the change in the accumulating amount of deposit in this combustion cycle by adding the calculated increasing amount and decreasing amount of deposit (Step S5). Then, the ECU 10 integrates the accumulating amount of deposit for every combustion cycle obtained in this way to estimate the total accumulating amount of deposit (Step S6).

The ECU 10 also performs a control to count the number of combustion cycles (accumulating period control) in parallel to the deposit amount estimation control (Step S7). The ECU 10 adds to the read count number of combustion cycles (the number of combustion cycles after the completion of the deposit removal control described later), the number of combustion cycles in combustion started thereafter.

The ECU 10 constantly compares the total accumulating amount of deposit with a given setting value T1 (stored in the deposit information memory 10e) (Step S8), and if it determines that the total accumulating amount of deposit is more than the given setting value T1, it starts the deposit removal control (Step S9).

The ECU 10 also compares the number of combustion cycles with a given setting value N1 (stored in the deposit information memory 10e) (Step S10), and if it determines that the number of combustion cycles is more than the given setting value N1, it starts the deposit removal control again.

The setting value N1 is set so that a period for determining the start of the deposit removal control in the accumulating period control becomes longer than the period in the deposit amount estimation control. That is, the accumulating period control is a preliminary control, and is provided in order to perform the removal of deposit more securely. Since the accumulating period control is independent from the deposit amount estimation control, the removal of deposit is performed even more securely.

When the ECU 10 starts the deposit removal control, the ECU 10 first refers to the map (deposit control range map). Then, the ECU 10 determines whether the current operating range of the engine 1 is the execution limited range based on the electrical signals inputted from the various sensors SW1-SW17. If the operating range of the engine 1 is the execution limited range, it waits for the execution of the deposit removal control until the operating range is deviated from the execution limited range.

On the other hand, if the operating range is not the execution limited range, the ECU 10 corrects the EGR rate to be originally set to make it lower, and controls the EGR valve 54 based on the corrected EGR rate. Thereby, since the amount of external EGR gas introduced into the combustion chamber 17 becomes less, the knocking occurs inside the combustion chamber 17 each time combustion is performed. As a result, the deposit is removed by the impact of the knocking every combustion cycle.

The ECU 10 performs the deposit amount estimation control described above also during the execution of the deposit removal control. In detail, as illustrated in FIG. 12B, the ECU 10 performs the deposit amount increasing processing and the deposit amount decreasing processing, and calculates the total accumulating amount of deposit which decreases during the execution of the deposit removal control (Steps S11-S13).

The ECU 10 compares, during the execution of the deposit removal control, the total accumulating amount of deposit with a given setting value T2 (stored in the deposit information memory 10e) (Step S14), and if it determines that the total accumulating amount of deposit is less than the given setting value T2, it ends the deposit removal control (Step S15).

The ECU 10 performs the accumulating period control described above also during the execution of the deposit removal control. In detail, the ECU 10 counts the number of combustion cycles after the deposit removal control is started (Step S16). Then, the ECU 10 compares the number of combustion cycles with a given setting value N2 (stored in the deposit information memory 10e) (Step S17), and if the ECU 10 determines that the number of combustion cycles after the deposit removal control is started is more than the given setting value T2, it ends the deposit removal control.

In detail, the ECU 10 controls the EGR valve 54 so that the EGR rate resumes the rate to be originally set (increases the EGR rate). Thereby, since the introducing amount of external EGR gas returns to the appropriate value, the occurrence of knocking is reduced and the original combustion state is resumed.

The ECU 10 performs such a series of controls and processings until the ignition switch is turned off (Step S18). Therefore, the amount of deposit being deposited in the combustion chamber 17 over time according to the operation of the engine 1 is controlled suitably. Since the amount of deposit does not become excessive, the pre-ignition can be effectively reduced.

If the ignition switch is turned off (YES at Step S18), the ECU 10 stores the total accumulating amount of deposit at the time, and the number of combustion cycles after the termination of the deposit removal control in the memory 10b (deposit information memory 10e) (Step S19).

Note that the setting values T1, T2, N1, and N2 may suitably be changed according to the specification of the engine.

(Modifications)

As illustrated by two-dot chain lines in FIG. 11, a control for advancing the ignition timing of the ignition plug 25 may be further performed in the deposit removal control. If the ignition timing is advanced, knocking becomes easier to be caused. Therefore, if the ignition timing is advanced in combination with the reduction of the amount of external EGR gas introduced into the combustion chamber 17, knocking tends to become more easily caused.

Note that the technology disclosed is not limited to the embodiment described above, and also encompasses other various configurations. For example, although in the embodiment described above the engine which performs SPCCI combustion is illustrated, it is not limited to this configuration. The technology disclosed is applicable as long as the engine performs combustion by igniting by an ignition plug while introducing EGR gas.

DESCRIPTION OF REFERENCE CHARACTERS

1 Engine
10 ECU (Control Device)
17 Combustion Chamber
25 Ignition Plug
40 Intake Passage
44 Supercharger
50 Exhaust Passage
52 EGR Passage
54 EGR Valve
61 Fuel Supply System
10d Deposit Reducing Module
10e Deposit Information Memory

What is claimed is:

1. A combustion control system for an engine mounted on an automobile, comprising:
   an ignition plug configured to ignite a mixture gas inside a combustion chamber of the engine;
   an intake passage configured to introduce intake gas into the combustion chamber;
   an exhaust passage configured to discharge exhaust gas generated inside the combustion chamber;
   an exhaust gas recirculation (EGR) passage communicating with the intake passage and the exhaust passage and configured to recirculate a portion of the exhaust gas into the intake passage;
   an EGR valve configured to adjust an amount of the exhaust gas flowing through the EGR passage;
   an in-cylinder pressure sensor configured to detect a pressure inside the combustion chamber; and
   a control device configured to control the ignition plug and the EGR valve according to an operating state of the engine, the control device including a processor configured to execute a deposit reducing module to reduce deposit being accumulated inside the combustion chamber,
   wherein the deposit reducing module performs a deposit amount estimation control in which an accumulating amount of the deposit is estimated, and a deposit removal control in which the deposit is removed when the estimated accumulating amount of the deposit becomes more than a given setting value,
   wherein in the deposit removal control, a control of the ignition plug in which the mixture gas is caused to combust by igniting the mixture gas, and a control of the EGR valve in which the amount of the exhaust gas introduced into the combustion chamber is decreased are performed, and
   wherein the deposit reducing module performs, in the deposit amount estimation control, a deposit increasing amount estimation processing in which an increasing amount of the deposit that changes with time is estimated based on a surface temperature of a piston exposed to the combustion chamber, and a deposit decreasing amount estimation processing in which a decreasing amount of the deposit that changes with time is estimated based on a given combustion noise index value calculated based on a detection value of the in-cylinder pressure sensor, to estimate the accumulating amount of deposit based on the increasing amount and the decreasing amount of deposit.

2. The engine combustion control system of claim 1, wherein the performance of the deposit removal control is limited when a load is higher than a given value in the operating range of the engine.

3. The engine combustion control system of claim 1, wherein the deposit reducing module performs, during the execution of the deposit removal control, the deposit increasing amount estimation processing and the deposit decreasing amount estimation processing to estimate the accumulating amount of deposit based on the increasing amount and the decreasing amount of deposit, and when the estimated accumulating amount of deposit becomes below a given setting value, the deposit reducing module ends the deposit removal control.

4. The engine combustion control system of claim 1, wherein the deposit reducing module further performs, after the execution of the deposit removal control, an accumulating period control to determine whether a given period is lapsed, and performs the deposit removal control also when the given period is lapsed.

5. The engine combustion control system of claim 1, wherein a control in which an ignition timing of the ignition plug is advanced is further performed in the deposit removal control.

6. A method of controlling combustion of an engine mounted on an automobile, the engine including:
- an ignition plug configured to ignite a mixture gas inside a combustion chamber of the engine;
- an intake passage configured to introduce intake gas into the combustion chamber;
- an exhaust passage configured to discharge exhaust gas generated inside the combustion chamber;
- an exhaust gas recirculation (EGR) passage communicating with the intake passage and the exhaust passage and configured to recirculate a portion of the exhaust gas into the intake passage;
- an EGR valve configured to adjust an amount of the exhaust gas flowing through the EGR passage; and
- an in-cylinder pressure sensor configured to detect a pressure inside the combustion chamber, the method comprising:
- controlling the ignition plug and the EGR valve according to an operating state of the engine; and
- reducing deposit being accumulated inside the combustion chamber, the reducing the deposit including:
  - performing a deposit amount estimation control in which an accumulating amount of the deposit is estimated, and a deposit removal control in which the deposit is removed when the estimated accumulating amount of the deposit becomes more than a given setting value;
  - in the deposit removal control, performing a control of the ignition plug in which the mixture gas is caused to combust by igniting the mixture gas, and a control of the EGR valve in which the amount of the exhaust gas introduced into the combustion chamber is decreased; and
  - in the deposit amount estimation control, performing a deposit increasing amount estimation processing in which an increasing amount of the deposit that changes with time is estimated based on a surface temperature of a piston exposed to the combustion chamber, and a deposit decreasing amount estimation processing in which a decreasing amount of the deposit that changes with time is estimated based on a given combustion noise index value calculated based on a detection value of the in-cylinder pressure sensor, to estimate the accumulating amount of deposit based on the increasing amount and the decreasing amount of deposit.

* * * * *